INVENTORS:
HEINZ KORNBICHLER
WALTER ULLRICH
ALFRED MAINKA
KARL-HEINZ LOHSE
By: Spencer & Kaye
Attorneys Sept. 16, 1969  H. KORNBICHLER ET AL  3,467,578
REACTORS
Filed July 25, 1966  2 Sheets-Sheet 2

INVENTORS:
HEINZ KORNBICHLER
WALTER ULLRICH
ALFRED MAINKA
KARL-HEINZ LOHSE

By: Spencer & Kaye
Attorneys

United States Patent Office 3,467,578
Patented Sept. 16, 1969

3,467,578
REACTORS
Heinz Kornbichler, Falkenstein, Taunus, Walter Ullrich, Neu-Isenburg, Alfred Mainka, Kelsterbach, and Karl-Heinz Lohse, Frankfurt am Main, Germany, assignors to Licentia Patent-Verwaltungs-G.m.b.H., Frankfurt am Main, Germany
Filed July 25, 1966, Ser. No. 567,531
Claims priority, application Germany, July 23, 1965, L 51,206
Int. Cl. G21c 15/12
U.S. Cl. 176—61
17 Claims

ABSTRACT OF THE DISCLOSURE

In a boiling water reactor pressure vessel of the type employing forced circulation of a cooling medium contained therein and enclosing a core and an annular back-flow space surrounding the core, at least one forced circulation pump including a rotary impeller disposed in the lower portion of the back-flow space within the pressure vessel, the impeller being arranged to have a vertical axis of rotation for imparting a downward vertical movement to the liquid medium present in the back-flow space.

---

The present invention relates to a reactor, and particularly to a boiling water reactor whose cooling medium is subjected to a forced circulation.

It is known that for the proper operation of large capacity boiling water reactors a forced circulation must be induced in the cooling medium. It has already been suggested to produce a suitable forced circulation by providing a plurality of laterally extending fluid flow channels in the form of loops which lead away from the reactor pressure vessel and by disposing forced circulation pumps in these loops. However, an arrangement of this type has the decided disadvantage that the forced circulation loops occupy a large amount of space outside of the reactor pressure vessel. As a result, the concrete shielding which must surround the reactor must be disposed at a large distance from the pressure vessel, thus leading to an undesirable enlargement of the entire installation.

It is a primary object of the present invention to overcome these drawbacks.

A more specific object of the present invention is to reduce the total space occupied by a boiling water reactor provided with forced circulation means.

Another object of the present invention is to provide increased safety to personnel in the event such a reactor should experience a malfunction.

These and other objects according to the present invention are achieved by the provision, in a boiling water reactor of the type employing forced circulation of a cooling medium and having a pressure vessel containing the cooling medium, of at least one forced circulation pump composed of rotary impeller means disposed within the pressure vessel, pump shaft means connected for driving the impeller means, and pump driving means connected to drive the shaft means. According to a specific embodiment of the present invention, the pump further includes shaft casing means enclosing the shaft means and passing together with the shaft means through the wall of the pressure vessel, and the pump driving means are disposed outside of the pressure vessel. In another embodiment of the present invention, the pump is disposed entirely within the pressure vessel.

In accordance with a further feature of the present invention, the pressure vessel interior is provided with a back-flow space which surrounds the reactor core and the pump impeller means is disposed in the lower portion of this back-flow space.

These arrangements according to the present invention present the advantage of substantially reducing the space outside of the pressure vessel required for the forced circulation pumps. It presents the added advantage of requiring extremely small openings in the reactor vessel wall and thus of providing a high degree of safety to personnel in the event the reactor malfunctions.

Additional objects and advantages of the present invention will become apparent upon consideration of the following description when taken in conjunction with the accompanying drawings in which:

FIGURE 3 is a cross-sectional, detail view of a portion of the arrangement of FIGURE 1a.

FIGURE 4 is a detail, cross-sectional view of a modified version of a portion of the arrangement of FIGURE 1a.

FIGURE 6 is a cross-sectional plan view of the arrangement of FIGURE 1a.

Figure 1A:
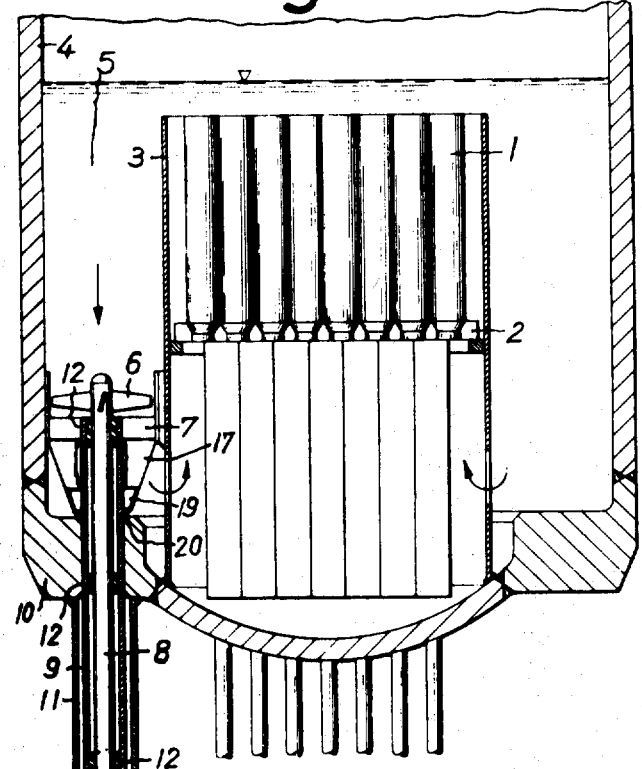
FIGURE 1a is a longitudinal, cross-sectional view through the lower half of a boiling water reactor incorporating one embodiment of the present invention.

FIGURE 1a shows the lower half of a boiling water reactor pressure vessel 4 containing a cooling medium which flows in the direction of the arrows through a group of fuel elements 1 forming the reactor core and mounted on a supporting grid 2 and through an annular back-flow space 5 disposed around the fuel elements 1. The fuel elements are separated from the back-flow space by core shroud 3. The cooling medium normally is urged in the direction of the arrows by convection, the medium being heated by the fuel elements 1 and rising to the surface where it is separated into the liquid and vapor phases, the liquid phase then flowing downward through the back-flow space 5, and through openings provided in shroud 3 into the region occupied by fuel elements 1.

As known, this natural convection is not capable, by itself, of producing an adequate cooling medium flow in high capacity boiling water reactors and must therefore be augmented by the action of forced circulation pumps.

According to the present invention, this forced circulation is produced by one or more pumps each arranged as shown in FIGURE 1a. According to this arrangement, each pump, which is of the rotary type, is provided with a plurality of circumferentially spaced blades constituting a rotary impeller 6 which together with its idler wheel (not shown) and the back-flow housing 17, is disposed within the reactor pressure vessel 4 and at the lower end of back-flow space 5. Impeller 6 is mounted at the upper end of a rotary pump shaft 8 whose lower end is rigidly connected to, and driven by, pump driving means constituted by an electric motor 16, the shaft being coupled to the motor by means of a suitable coupling 15 of the type which permits the motor 16 to be readily uncoupled from the shaft 8.

Shaft 8 is enclosed by a shaft casing means in the form of a tubular housing 9 which supports the shaft through the intermediary of a plurality of longitudinally spaced bearings 12. At the lower end of the shaft, a packing in the form of a gasket 13 is provided for producing a liquid tight seal between the shaft and the tubular housing. This seal is not necessary if a water tight canned motor is used. Housing 9 passes through a suitably dimensioned opening formed in the base 10 of the pressure vessel and carries, at its upper end, a rim of guide blading. The housing also carries, at a point below the rim of guide blading 7, a plug member 19 which is spaced several millimeters above base 10 during normal use and whose purpose will be described in detail below. The opening in base 10 is dimensioned to fit closely around housing 9, while permitting the housing to slide easily therein.

The pump assembly further includes a rigid supporting sheath 11 whose upper end is welded to base 10 and whose lower end carries a sealing flange 14 which is connected to the housing of motor 16 through the intermediary of an outer, stationary portion of detachable coupling 15.

It may be appreciated that the arrangement shown in FIGURE 1a permits a considerable space saving to be realized in comparison with previous arrangements employing laterally extending loops for the forced circulation of the cooling medium. When an arrangement according to the present invention is employed with the type of reactor in which the core control rods are inserted into the pressure vessel from below, the actual space saving is even more significant because at least a portion of the pump assembly occupies the space which must be provided for the control rods.

It may also be noted that the openings provided in the base 10 or core vessel 4 need only be large enough to permit the passage of shaft housing 9 and will therefore have a diameter which is considerably less than the diameter of the openings required for the passage of cooling medium into the forced circulation loops of prior art arrangements. It has been found, for example, that the diameter of each opening in base 10 can be made less than half as large as the openings required for the passages of cooling medium into the loops of prior art reactors of equal capacity. Since the size of the openings in the pressure vessel wall has a direct effect on the ability of the vessel to withstand high pressures, the small openings required for forced circulation arrangements according to the present invention serve to greatly reduce the danger that the pressure vessel walls will fail, and hence the risk of injury to personnel in the event of reactor malfunction.

Figure 2:
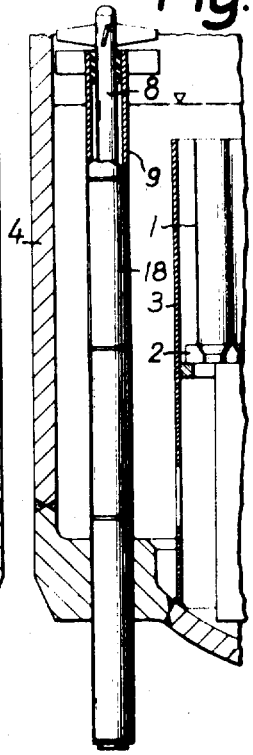
FIGURE 2 is a partial, longitudinal cross-sectional view of the arrangement of FIGURE 1a showing another position for the pump impeller means according to the present invention.

One important feature of the present invention resides in the facility with which pump assemblies can be removed from the pressure vessel for replacement or repair. One manner in which a pump assembly according to the present invention can be removed from below is illustrated in FIGURE 2. Such a removal is carried out by first disconnecting coupling 15 so as to separate motor 16 from shaft 8 and housing 9 and then attaching extension pipes 18 to the bottom of housing 9. The reactor pressure vessel cover is then removed and pipes 18 are forced upwardly through the opening in base 10 until the impeller 6 is at a sufficient height to be lifted out of the pressure vessel.

Before removing the impeller and drive shaft through the top of the pressure vessel, it is of course necessary to provide an adequate seal between the reactor pressure vessel and both the drive shaft 8 and the extension pipes 18.

One significant advantage of removing the impeller and drive shaft through the top of the pressure vessel is that the opening in base 10 need only be large enough to receive the housing 9. If, on the other hand, it were necessary to remove this assembly by withdrawing it through the bottom of the pressure vessel, then the opening in base 10 would have to be considerably larger in order to permit the passage of impeller 6.

Figure 3:
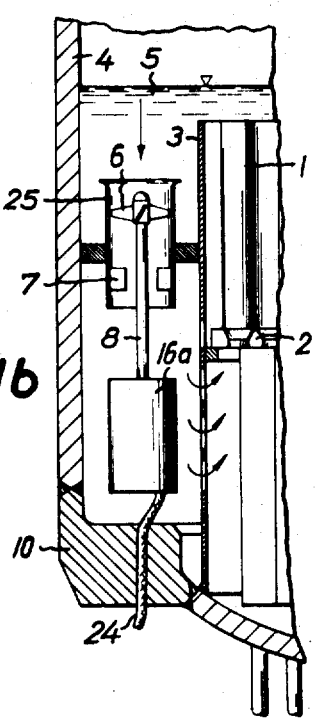

Another procedure for removing the impeller and drive shaft through the top of the presure vessel permits the necessary sealing to be effected in a simple manner and is illustrated in FIGURES 1a and 3. According to this procedure, as soon as the motor 16 is disconnected from the shaft 8, the shaft is lowered by several millimeters in order to seat the member 19 in a seating 20 formed in base 10 so as to seal the opening in base 10 from the interior of the pressure vessel. Then, as is shown in FIGURE 3, the lower end of sheath 11 is closed by the attachment of a sealing cap 21 to flange 14. Impeller 6 and the assembly of shaft 8 and housing 9 can then be lifted upwardly and removed through the top of core vessel 4, the escape of cooling medium being prevented by sealing cap 21.

Figure 6:
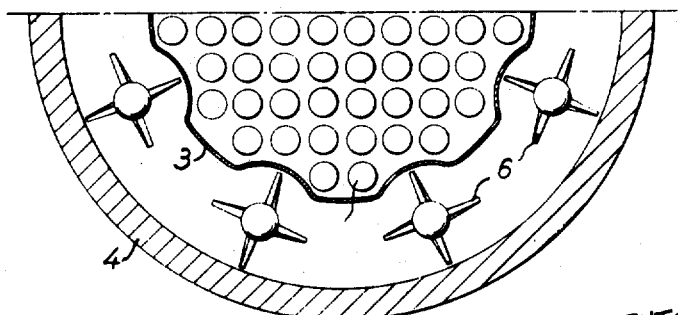

Although FIGURES 1a and 2 are shown to include only one pump, it should be appreciated that several identical pumps may be disposed around the periphery of pressure vessel 4, in the lower portion of back-flow space 5, as is illustrated in the plan view of FIGURE 6. This figure also illustrates that the core shroud 3 may be provided with a plurality of cylindrically arcuate indentations which extend over the entire height of the shielding for permitting the pressure vessel 4 to be provided with pumps having large diameter impellers, with each pump being disposed adjacent a respective indentation without requiring an enlargement of the diameter of the pressure vessel or a reduction in the average diameter of the reactor core. Since this permits relatively large diameter impellers to be used, it also permits a smaller number of pumps to be employed to obtain a desired amount of forced circulation.

In arrangements according to the present invention in which a plurality of pumps are employed, it may be desirable, if not indispensable, in the event one of the pumps should fail, that flow be entirely prevented through the path defined by the failing pump. This may be achieved, according to another feature of the present invention, by the provision of an arrangement of the type shown in FIGURE 4 in which each pump impeller 6 is disposed in a respective cylindrical flow passage for the cooling medium and a hydraulic slide valve 22 is disposed around housing 9 and is supported by a plurality of piston chambers. These piston chambers are hydraulically working. If a pump fails, valve 22 is forced against the lower end of the cylindrical pasage surrounding impeller 6, thereby to close the associated flow path, only if the impeller should cease to rotate. As long as the pump continues to operate, the flow produced by impeller 6 will apply a sufficient counter pressure to valve 22 to maintain it in the open condition shown in FIGURE 4. When the pump fails, this counter pressure is eliminated and valve 22 closes. Thus, the operation of slide valve 22 is automatically controlled by the operation of the pump. In order to permit the slide valve to move freely, the upper end of housing 9 is provided with a portion 20 having a reduced outer diameter.

Figure 4:
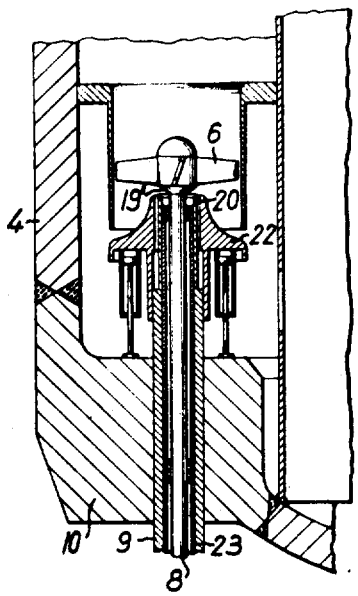

In accordance with another feature of the embodiment of FIGURE 4, there is additionally provided a sleeve 23 which is fitted into housing 9 and which carries the shaft bearings. The dimensions of sleeve 23 are chosen to permit it to slide in a longitudinal manner with respect to housing 9 so that if it is necessary to repair or replace the shaft bearings, they can be removed from the assembly by merely sliding sleeve 23 downwardly until it is completely free of housing 9 and shaft 8. It is, of course, necessary to remove the pump drive motor before sleeve 23 can be removed. In order to prevent any leakage of the cooling medium during the removal of sleeve 23, the upper end of drive shaft 8 is provided with an enlarged portion 19' and the drive shaft is lowered slightly before sleeve 23 is removed in order to cause portion 19' to seat on the upper end of portion 20 and thus to close the upper end of the passage defined by the interior of housing 9.

Figure 5:
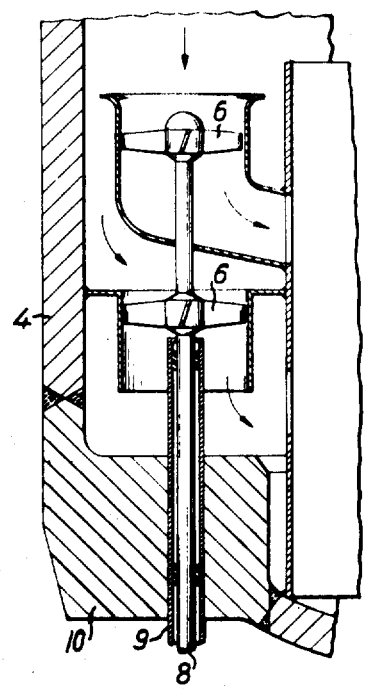
FIGURE 5 is a view similar to that of FIGURE 4 showing another modification according to the present invention.

It may also be desirable to increase the amount of forced circulation produced by each pump by providing two or more rotors on each drive shaft and by disposing each rotor in a separate cooling medium flow path. Such an arrangement is shown in FIGURE 5 wherein the drive shaft 8 carries two impellers 6, each of which is disposed in a separate flow path defined by a cylindrical tube. This arrangement effectively permits a doubling of the pumping capacity of each pump.

In order to optimize the pumping capacity of arrangements according to the present invention, it has been found to be advantageous to arrange the associated pressure vessel wall so that all of the pump shafts have vertical axes of rotation. This can readily be accomplished by providing local reinforcements or, as is shown in FIGURE 1a, by providing all of the shaft passages, or openings, in an annular body 10 made of a suitable material, such as cast iron for example.

It is also possible to achieve a further simplification according to the present invention by disposing each complete pump assembly entirely inside the pressure vessel. For this purpose, it is necessary to provide a motor arrangement which is capable of operating underwater. This arrangement, in addition to permitting a considerable structural simplification of the pump assembly, has the added advantage of eliminating the need for any openings whatsoever in the pressure vessel wall for forced circulation purposes.

Figure 1B:
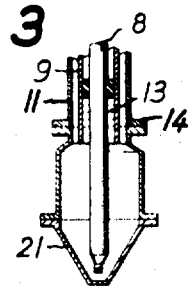
FIGURE 1b is a detail view similar to that of FIGURE 1a showing another embodiment of the invention.

As shown in FIGURE 1b the canned motor 16a is disposed within the pressure vessel 4 in the back-flow space 5. The cable 24 delivers energy for driving the motor. This can be for instance an electrical drive by means of a canned motor. The water passes down through the inlet tube 25 and is subjected to driving pressure by the impeller 6 driven by the motor via shaft 8. Afterwards the water passes through the rim of guide blading 7 and the openings in shroud 3 into the region occupied by fuel elements 1. The function of the other units of the pump is the same as described above in columns 2 and 3.

It will be understood that the above description of the present invention is susceptible to various modifications, changes, and adaptations and the same are intended to be comprehended within the meaning and range of equivalents of the appended claims.

What is claimed is:

1. In combination with a boiling water reactor pressure vessel of the type having a removable cover and employing forced circulation of a cooling medium contained therein and enclosing a core and an annular back-flow space surrounding the core, the entire back-flow space being disposed laterally outside the region occupied by the core, at least one forced circulation pump comprising:
   (a) rotary impeller means having a vertical axis of rotation and disposed in said back-flow space within said pressure vessel so as to be spaced laterally outside the region occupied by said core;
   (b) pump shaft means connected for driving said impeller means, the bottom of said pressure vessel being provided with an opening through which said shaft means passes;
   (c) pump driving means disposed outside of said pressure vessel for driving said shaft means; and
   (d) detachable coupling means connecting said driving means to said shaft means, whereby upon detachment of said coupling means said impeller means can be removed from said vessel by being drawn upwardly through said back-flow space.

2. An arrangement as defined in claim 1 further comprising shaft casing means enclosing said shaft means and passing through said opening.

3. An arrangement as defined in claim 2 wherein said impeller means are disposed in the lower portion of said back-flow space.

4. An arrangement as defined in claim 3 further comprising sealing cap attachment means connected to that end of said casing means which is disposed outside of said pressure vessel.

5. An arrangement as defined in claim 3 wherein said shaft casing means are slideable with respect to the wall of said pressure vessel and are arranged for receiving extension tubes for raising said casing means and shaft means to permit their removal from said pressure vessel, said arrangement further comprising fluid sealing means disposed between said pressure vessel and said casing means.

6. An arrangement as defined in claim 3 wherein said pressure vessel wall opening is provided with a seating adjacent the inner surface of said wall and said casing means are slideably disposed in said opening, said arrangement further comprising annular sealing means mounted at the upper end of said casing means for cooperating with said seating to create a seal.

7. In combination with a boiling water reactor pressure vessel of the type employing forced circulation of a cooling medium contained therein and enclosing a core and an annular back-flow space surrounding the core, at least one forced circulation pump comprising:
   (a) rotary impeller means having a vertical axis of rotation and disposed in said back-flow space within said pressure vessel;
   (b) pump shaft means connected for driving said impeller means, the wall of said pressure vessel being provided with an opening through which said shaft means passes;
   (c) pump driving means disposed outside of said pressure vessel and connected to drive said shaft means;
   (d) shaft casing means enclosing said shaft means and passing through said opening; and
   (e) a slide valve disposed within said back-flow space and mounted to slide with respect to said casing means for preventing the flow of cooling medium past said impeller means when said pump ceases to operate.

8. An arrangement as defined in claim 7 wherein said slide valve is of the hydraulic type.

9. An arrangement as defined in claim 2 wherein said casing means passes vertically through said opening.

10. An arrangement as defined in claim 2 wherein said pressure vessel is provided with a local reinforcement in the vicinity of said opening.

11. An arrangement as defined in claim 2 wherein a plurality of forced circulation pumps are provided, said pressure vessel wall is provided with a plurality of openings, one for each said pump, and said pressure vessel includes a one-piece annular base member in which all of said openings are disposed.

12. An arrangement as defined in claim 2 further comprising: a tubular sleeve slideably disposed in said casing means; and at least one shaft bearing carried by said sleeve and supporting said shaft means, said sleeve being downwardly slideable with respect to said casing means for removal from said pump.

13. An arrangement as defined in claim 1 wherein said shaft means and said driving means are disposed within said pressure vessel.

14. An arrangement as defined in claim 13 wherein said driving means are constituted by an electric motor capable of operating under water.

15. An arrangement as defined in claim 2 wherein said pressure vessel is of the type in which the control rods for said core are inserted from below.

16. In combination with a boiling water reactor pressure vessel of the type employing forced circulation of a cooling medium contained therein and enclosing a core and an annular back-flow space surrounding the core, at least one forced circulation pump comprising:
   (a) rotary impeller means having a vertical axis of rotation and disposed in said back-flow space within said pressure vessel, said impeller means being constituted by two longitudinally spaced rotors for producing a double flow of cooling medium;
   (b) pump shaft means connected for driving said impeller means, the wall of said pressure vessel being provided with an opening through which said shaft means passes;

(c) pump driving means disposed outside of said pressure vessel and connected to drive said shaft means; and (d) shaft casing means enclosing said shaft means and passing through said opening.

17. In combination with a boiling water reactor pressure vessel of the type employing forced circulation of a cooling medium contained therein and enclosing a core and an annular backflow space surrounding the core, at least one forced circulation pump comprising:

(a) rotary impeller means having a vertical axis of rotation and disposed in said back-flow space within said pressure vessel;

(b) pump shaft means connected for driving said impeller means; and (c) pump driving means connected for driving said shaft means;

(d) wherein said pressure vessel has a substantially cylindrical shape and further includes a substantially cylindrical reactor core and a substantially cylindrical core shroud surrounding said core, said impeller means having a diameter which is larger than the minimum distance between said shroud and said pressure vessel, and both said core and said shroud are provided with at least one cylindrical, arcuate indentation in the vicinity of said impeller means for creating a space sufficient to receive said impeller means, said indentation extending along the entire length of said core and said shroud.

References Cited

UNITED STATES PATENTS

| | | | |
|---|---|---|---|
| 2,994,657 | 8/1961 | Petrick | 176—54 |
| 3,213,833 | 10/1965 | Cunningham et al. | 176—53 |
| 3,231,474 | 1/1966 | Jones et al. | 176—54 |
| 3,255,089 | 6/1966 | Deighton | 176—53 |
| 3,274,065 | 9/1966 | Kierulf et al. | 176—61 |
| 3,325,374 | 6/1967 | Margen | 176—61 |

FOREIGN PATENTS 1,198,728   6/1959   France.

BENJAMIN R. PADGETT, Primary Examiner

H. E. BEHREND, Assistant Examiner

U.S. Cl. X.R.

176—54, 65